United States Patent [19]  
Lundbohm

[11] 4,148,341  
[45] Apr. 10, 1979

[54] LONG-DISTANCE HEATING CONDUIT

[75] Inventor: Lennart Lundbohm, Ektorp, Sweden

[73] Assignee: Gränges NYBY AB, Sweden

[21] Appl. No.: 796,866

[22] Filed: May 16, 1977

Related U.S. Application Data

[63] Continuation of Ser. No. 515,413, Oct. 16, 1974, abandoned.

[30] Foreign Application Priority Data

Oct. 19, 1973 [DE] Fed. Rep. of Germany ....... 2352623

[51] Int. Cl.$^2$ ............................ F16L 1/00; F16L 9/14; F16L 9/22
[52] U.S. Cl. .................................. 138/105; 138/103; 138/107; 138/111; 138/114; 138/149; 138/115; 138/156; 138/178
[58] Field of Search ............... 138/105, 106, 111, 112, 138/149, 155, 157, 115, 161, 103, 177, 178; 61/72.1, 72.4, 10, 11, 12, 13, 106; 239/542, 547

[56] References Cited

U.S. PATENT DOCUMENTS

| Re. 14,970 | 10/1920 | Steffens | 138/105 X |
| 367,262 | 7/1887 | Battin | 138/103 |
| 2,312,282 | 2/1943 | Peet | 138/137 |
| 2,405,330 | 8/1946 | Ryder | 138/149 X |
| 2,451,145 | 10/1948 | Baker et al. | 138/149 |
| 2,532,587 | 12/1950 | Williamson | 138/149 |
| 2,773,512 | 12/1956 | Burk | 138/105 |
| 2,778,759 | 1/1957 | Stephens et al. | 138/149 X |
| 2,857,648 | 10/1958 | March | 138/105 X |
| 3,150,691 | 9/1964 | Peterson | 138/105 |
| 3,492,029 | 1/1970 | French et al. | 138/149 X |
| 3,890,447 | 6/1975 | Shatney | 426/105 |

FOREIGN PATENT DOCUMENTS 46-10986  5/1969  Japan ..................................... 138/149

*Primary Examiner*—Richard E. Aegerter  
*Assistant Examiner*—James E. Bryant, III  
*Attorney, Agent, or Firm*—Craig & Antonelli

[57] ABSTRACT

A long-distance heating conduit comprising one or more tubes which carry the heating medium, are laid in the conduit and are surrounded individually or jointly by at least one layer of heat-insulating material and are covered by at least one cover foil which extends in a closed path round the tube or tubes and is provided with holes.

30 Claims, 4 Drawing Figures

LONG-DISTANCE HEATING CONDUIT

This is a continuation of application Ser. No. 515,413 filed Oct. 16, 1974, now abandoned.

The invention relates to a long-distance heating conduit, in particular for hot water lines, comprising one or more tubes which carry the heating medium, are laid in the conduit and are surrounded by heat-insulating material, the heat-insulating material surrounding the tubes being resistant to compression and protected by a cover from moisture.

A long-distance heating conduit has been proposed which is self-drying. The insulating composition therein is not surrounded by a water-tight cover but by two or more overlapping cover foils provided with holes. The holes are so small that they allow the vapour rising from the insulating material and forming on evaporation of the water which has penetrated to escape but on the other hand prevent water penetrating through the holes into the insulating composition.

Such water runs down at the overlapping areas to the bottom of the conduit where it passes to the drainage tubes at said bottom.

The problem underlying the invention is to improve such a long-distance heating conduit, in particular the thermal and moisture insulation thereof. According to the invention this is achieved in that each of the tubes is surrounded individually or a plurality of tubes is surrounded jointly by means of a cover foil provided with holes. It has been found that the protection against moisture and the self-drying effect are substantially improved by the covering of the tubes formed according to the invention.

It has been found that particularly advantageous insulating materials are performed bodies pressed or formed from mineral wool, glass wool, foamed plastic or the like, in the form of hollow cylindrical sections which enclose the tube over an angular sector of 180°, 120° or 90° of the periphery so that two, three or four sections are sufficient to surround a tube.

The use of such hollow cylindrical sections not only has the advantage of a particularly simple assembly but also the further advantage that it is no longer absolutely essential to lay the tubes on a compression-resistant support.

Advantageously, the cover foil forming a closed covering is formed from strip-shaped foil material in that the strips are laid round the tube enclosed in insulating material and closed at the joints by adhering, welding or folding.

According to the invention it is particularly advantageous when the tube or the tubes are not enclosed by one closed cover foil covering but by a plurality of closed cover foil coverings, an insulating material layer advantageously being disposed between the individual foil coverings and possibly consisting in the manner described above of preformed insulating material bodies in the form of hollow cylindrical sections.

Preferably, the tubes are provided before laying them in the long-distance heating conduit with the insulating material enclosure and the cover foil covering and introduced in sections into the long-distance heating conduit. At the joints the tubes are then welded together and the insulating layer or layers as well as the cover foil covering or coverings applied by subsequent insertion of insulating material pressed bodies in the form of hollow cylindrical sections and by sleeves of cover foil which are disposed over the joints and which are joined to the remaining cover foil by welding, adhering or the like.

According to the invention the cover foil may have holes of different size, i.e., for example fine holes at the top and the sides of the insulating composition and larger holes at the lower side. The fine holes are so small that they prevent water from penetrating therethrough from outside to the insulating composition but on the other hand allow the vapor forming on evaporation of penetrated water to escape. On the other hand the larger holes at the bottom are so dimensioned that water can flow through them from the inside to the outside. This may be water of condensation which collects in the lower region inside the foil covering or for example water which penetrates into the insulating composition in cases of flooding or heavy rain.

The embodiment of a heating conduit according to the invention also ensures that when the insulating composition has become moist throughout due to flooding or other entry of water rapid drying is obtained, i.e., the impregnation is only for a short period which can be withstood in particular by chromium steel; no long-period impregnation as in the known heating conduits occurs. In the latter very long drying times are necessary during which of course the danger of corrosion is particularly high.

Other advantages and novel features of the invention will become apparent from the following detailed description of the invention when considered in conjunction with the accompanying drawings, in which FIG. 1 is a cross-section through a heating conduit made according to the invention with two heating medium tubes laid therein;

Drain pipes 2 are laid at the bottom of a heating conduit 1. The tubes 3 carrying the heating medium rest on insulating material blocks 4 which may be continuous or alternatively consist of individually spaced apart support blocks pressed from insulating material instead of the blocks 4. However, a loose filling of the insulating material may also be used.

Figure 1:
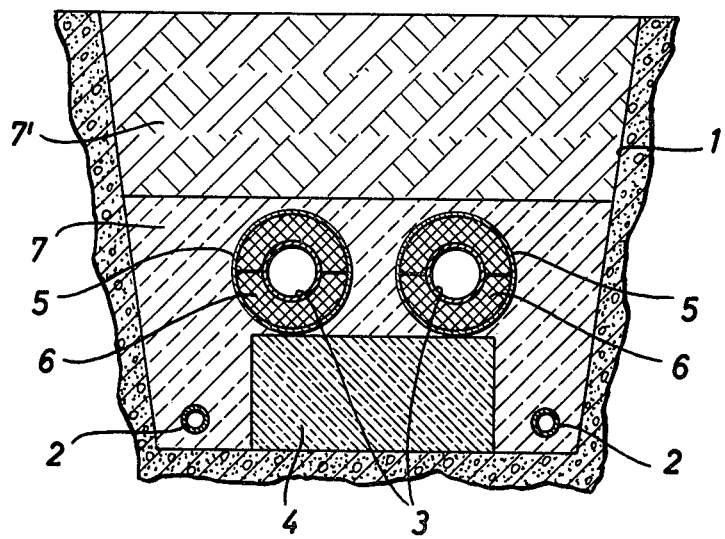

The tubes 3 are surrounded by an insulating material enclosure 6 which consists of preformed bodies in the form of hollow cylindrical sections. In the example of embodiment according to FIG. 1 the tubes 3 are each enclosed by two hollow cylindrical sections which each cover an angular sector of 180° of the tube periphery. The insulating bodies consist preferably of mineral wool, glass wool or foamed plastic.

The space above the insulating material blocks 4 and between the tubes 3 surrounded by the insulating material enclosures 6 and the foil coverings 5 is filled with an insulating material loose filling 7 which also covers the drainage tubes 2. The space above the insulating material filling 7 is filled with excavated material 7' up to ground level. Alternatively, the conduit can be covered by a road surface because the structure according to the invention can support a load.

Figure 2:
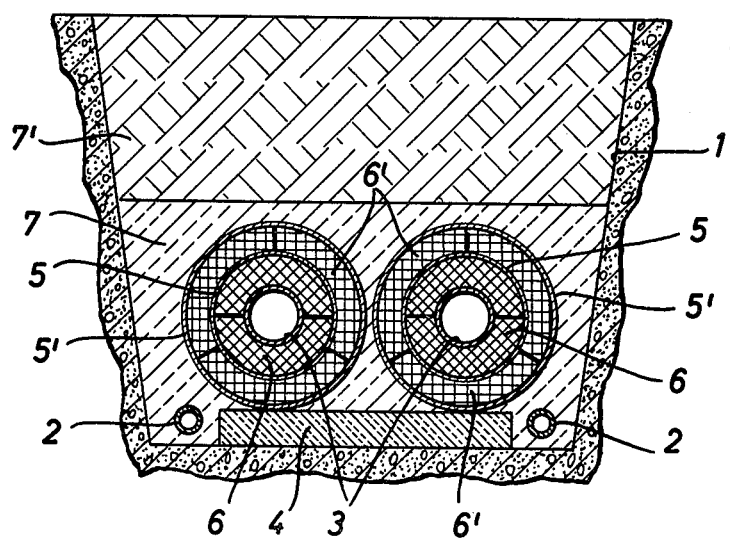
FIG. 2 is a cross-section similar to FIG. 1 through a modified embodiment of the heating conduit according to the invention.

In the example of embodiment according to FIG. 2 each of the tubes 3 is surrounded by a first and a second insulating material enclosure 6 and 6' between which a first cover foil covering 5 is disposed. A second foil covering 5' is then placed round said outer insulating material enclosure 6'.

In the example of embodiment according to FIG. 2 the insulating material enclosure 6 consists of preformed insulating material bodies in the form of hollow cylindrical sections which enclose the tube 3 over an angular sector of 180° of the tube periphery. The insulating material enclosure 6' consists of three preformed insulating material bodies in the form of hollow cylindrical sections which enclose an angular sector of 120° of the tube periphery in each case.

Figure 3:
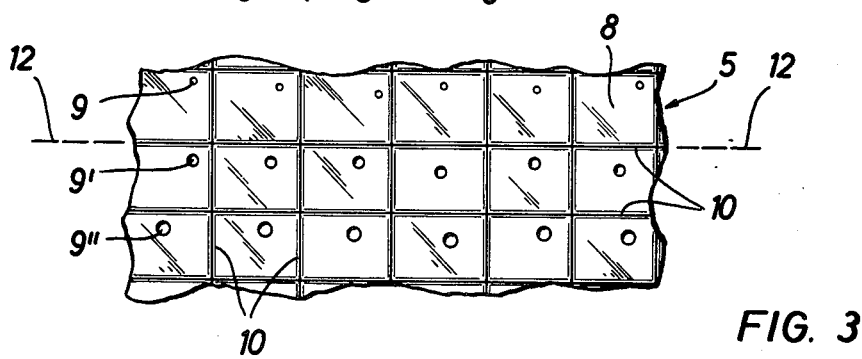
FIG. 3 is a portion of a cover foil in plan view.

As shown by FIG. 3, cover foils with which the insulating material enclosures are covered consist of an advantageously uniformly thick foundation layer 8 which is provided with holes 9,9' and 9" of 0.05 mm diameter and with reinforcing ribs 10 which extend over the foundation layer in the manner of a mesh. The side of the foils provided with reinforcing ribs lies on the insulating material enclosure. To achieve in the lower region of the conduit a better drainage of condensation water or water which has penetrated due to possible infiltration, only the portion of the foils which bears on the top and the sides of the insulating material enclosure 6, 6' is provided with holes 9 of a diameter of 0.05 mm and 0.2 mm whereas the holes 9', 8" in the lower half of the foil have a greater diameter. The separation between the upper and lower portion of the foil is indicated at 12 by a dashed line. The holes 9' and 9" may have a diameter up to 6 mm, preferably up to 4 mm.

Figure 4:
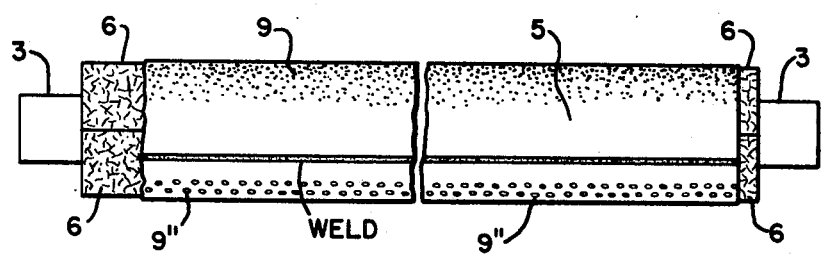
FIG. 4 is a longitudinal section through a heating conduit made according to the invention.

As illustrated in FIG. 4, each of the tubes 3 is surrounded by the cover foil 5 having its end sections joined together, for example, by welding and/or folding and/or adherence. The thus formed sections of tube 3, insulating material enclosures 6, and cover foil 5 may then be introduced into the long-distance heating conduit and joined together. Each of the cover foils 5 are provided with the holes 9 and 9" as described above.

In the drawings and specification preferred embodiments of the invention have been set forth and although specific terms are employed they are used in a general and descriptive sense only and not intended as limitation, the scope of the invention being defined in the claims.

What I claim is:

1. A long-distance heating conduit comprising one or more tubes which carry heating medium, laid in a long-distance conduit and are completely surrounded by heat-insulating material, and cover foils protecting the heat-insulating material from moisture, wherein the tubes carrying the heating medium are completely peripherally surrounded individually by at least one layer of heat-insulating material and are completely peripherally covered individually by at least one cover foil which extends in a closed path around each of the tubes and is provided with holes, wherein the insulating material enclosures consist of preformed bodies in the form of hollow cylindrical sections, wherein the hollow cylindrical sections enclose each of the tubes over a peripheral angle of about 120° in such a manner that three hollow cylindrical sections surround each of the tubes, wherein a portion of the cover foil which covers an upper region of each of the tubes is provided with holes of a predetermined diameter and a lower portion of the cover foil is provided with holes having a greater diameter than said predetermined diameter, and wherein support means are arranged for supporting said completely surrounded and covered tubes which tubes are completely and individually surrounded by said layer of heat-insulating material and individually covered completely by said cover foil.

2. A long-distance heating conduit comprising one or more tubes which carry heating medium, laid in a long-distance conduit and are completely surrounded by heat-insulating material, and cover foils protecting the heat-insulating material from moisture, wherein the tubes carrying the heating medium are peripherally completely surrounded individually by at least one layer of heat-insulating material and are individually completely covered peripherally by at least one cover foil which extends in a closed path around each of the tubes and is provided with holes, wherein the insulating material enclosures consist of preformed bodies in the form of hollow cylindrical sections, wherein the hollow cylindrical sections enclose each of the tubes over a peripheral angle of about 120° in such a manner that three hollow cylindrical sections surround each of the tubes, wherein a portion of the cover foil which covers an upper region of each of the tubes is provided with holes having a diameter of about 0.05 mm to about 0.2 mm and a lower portion of the cover foil is provided with holes having a diameter up to about 6 mm, and wherein support means are arranged for supporting said completely surrounded and covered tubes which tubes are completely and individually surrounded by said layer of heat-insulating material and individually covered completely by said cover foil.

3. A long-distance heating conduit comprising tube means for carrying a heating medium, said tube means being disposed with a long-distance conduit, and said tube means including:
   (a) at least one tubular member through which said heating medium is carried,
   (b) at least one layer of heat-insulating material completely peripherally surrounding each individual tubular member, said at least one layer consisting of preformed hollow cylindrical sections disposed with an outer cylindrical surface,
   (c) cover foil means contiguous to said outer cylindrical surface for protecting each individual tubular member and corresponding layer of heat-insulating material from moisture, said cover foil means completely peripherally surrounding said outer cylindrical surface of said heat-insulating layer, and
   (d) support means for supporting said completely surrounded and covered tubular member which tubular member is completely surrounded by said layer of heat-insulating material and covered by said cover foil means,
   wherein said cover foil means is a water impermeable foil layer, said foil layer having at least a portion covering an upper region of said outer cylindrical surface, said portion of said foil layer being provided with a plurality of holes, each of said holes having a diameter of about 0.05 mm to about 0.2 mm which prevents penetration of water therethrough but is permeable to water vapor within said cover foil means.

4. A long-distance heating conduit according to claim 3, wherein said tube means includes a plurality of tubular members, each of said tubular members being individually covered by at least one layer of said heat-insulating material and said cover foil means.

5. A long-distance heating conduit according to claim 3, wherein said water impermeable foil layer includes a base layer of uniform thickness and a plurality of intersecting reinforcing ribs disposed on at least one surface of said base layer.

6. A long-distance heating conduit according to claim 3, wherein said foil layer includes a strip of water impermeable material completely enclosing said outer cylindrical surface by means of a joint joining respective ends of said strip, said joint including at least one of an adherent bond, a weld or a fold.

7. A long-distance heating conduit according to claim 3, wherein a plurality of said layers of said heat-insulating material concentrically surround each individual tubular member, each respective one of said plurality of layers having one of said water impermeable foil layers contiguous to the respective outer cylindrical surface thereof.

8. A long-distance heating conduit according to claim 3, wherein each of said preformed hollow cylindrical sections enclose each individual tubular member over a peripheral angle of about 180°, and wherein said layer of heat-insulating material consists of two said cylindrical sections.

9. A long-distance heating conduit according to claim 3, wherein each of said preformed hollow cylindrical sections enclose each individual tubular member over a peripheral angle of about 120°, and wherein said layer of heat-insulating material consists of three said cylindrical sections.

10. A long-distance heating conduit according to claim 3, wherein each of said preformed hollow cylindrical sections enclose each individual tubular member over a peripheral angle of about 90°, and wherein said layer of heat-insulating material consists of four said cylindrical sections.

11. A long-distance heating conduit according to claim 3, wherein said foil layer includes a second portion covering a lower region of said outer cylindrical surface, said second portion of said foil layer being provided with a plurality of second holes, each of second holes having a diameter sufficiently large to allow water within said cover foil means to flow therethrough.

12. A long-distance heating conduit comprising
tube means for carrying a heating medium, said tube means being disposed with a long-distance conduit, and said tube means including:
(a) at least one tubular member through which said heating medium is carried,
(b) at least one layer of heat-insulating material completely peripherally surrounding each individual tubular member, said at least one layer consisting of preformed hollow cylindrical sections disposed with an outer cylindrical surface,
(c) cover foil means contiguous to said outer cylindrical surface for protecting each individual tubular member and corresponding layer of heat-insulating material from moisture, said cover foil means completely peripherally surrounding said outer cylindrical surface of said heat-insulating layer, and
(d) support means for supporting said completely surrounded and covered tubular member which tubular member is completely surrounded by said layer of heat-insulating material and covered by said cover foil means,
wherein said cover foil means is a water impermeable foil layer, said foil layer having at least a portion covering an upper region of said outer cylindrical surface, said portion of said foil layer being provided with a plurality of holes, each of said holes having a diameter which prevents penetration of water therethrough but is permeable to vapor within said cover foil means, and
wherein said foil layer includes a second portion covering a lower region of said outer cylindrical surface, said second portion of said foil layer being provided with a plurality of second holes, each of second holes having a diameter sufficiently large to allow water within said cover foil means to flow therethrough.

13. A long-distance heating conduit according to claim 12, wherein said diameter of said holes of said portion covering said upper region of said outer cylindrical surface is from about 0.05 mm to about 0.2 mm, and wherein said diameter of each of said second holes ranges up to about 6 mm.

14. A long-distance heating conduit according to claim 12, wherein said tube means includes a plurality of tubular members, each of said tubular members being individually covered by at least one layer of said heat-insulating material and said cover foil means.

15. A long-distance heating conduit comprising
tube means for carrying a heating medium, said tube means being disposed with a long-distance conduit, and said tube means including:
(a) at least one tubular member through which said heating medium is carried,
(b) at least one layer of heat-insulating material completely peripherally surrounding each individual tubular member, said at least one layer consisting of preformed hollow cylindrical sections disposed with an outer cylindrical surface,
(c) cover foil means contiguous to said outer cylindrical surface for protecting each individual tubular member and corresponding layer of heat-insulating material from moisture, said cover foil means completely peripherally surrounding said outer cylindrical surface of said heat-insulating layer,
(d) support means for supporting said completely surrounded and covered tubular member which tubular member is completely surrounded by said layer of heat-insulating material and covered by said cover foil means, and
(e) said at least one tubular member being prefabricated in sections with said heat-insulating material layer and cover foil means completely surrounding the periphery of said prefabricated sections, wherein said prefabricated sections are subsequently joined into a long-distance heating conduit, and said layers of heat-insulating material and cover foil means are applied to the joined portions of said conduit,
wherein said cover foil means is a water impermeable foil layer, said foil layer having at least a portion covering an upper region of said outer cylindrical surface, said portion of said foil layer being provided with a plurality of holes, each of said holes having a diameter of about 0.05 mm to about 0.2 mm which prevents penetration of water therethrough but is permeable to water vapor within said cover foil means.

16. A long-distance heating conduit comprising
tube means for carrying a heating medium, said tube means being disposed with a long-distance conduit, and said tube means including:
(a) at least one tubular member through which said heating medium is carried, (b) at least one layer of heat-insulating material completely peripherally surrounding each individual tubular member, said at least one layer consisting of preformed hollow cylindrical sections disposed with an outer cylindrical surface.

(c) cover foil means contiguous to said outer cylindrical surface for protecting each individual tubular member and corresponding layer of heat-insulating material from moisture, said cover foil means completely peripherally surrounding said outer cylindrical surface of said heat-insulating layer, (d) support means for supporting said completely surrounded and covered tubular member which tubular member is completely surrounded by said layer of heat-insulating material and covered by said cover foil means, and (e) said preformed hollow cylindrical sections of said heat-insulating material being constituted by at least one of mineral wool or glass wool, wherein said cover foil means is a water impermeable foil layer, said foil layer having at least a portion covering an upper region of said outer cylindrical surface, said portion of said foil layer being provided with a plurality of holes, each of said holes having a diameter of about 0.05 mm to about 0.2 mm which prevents penetration of water therethrough but is permeable to water vapor within said cover foil means.

17. A long-distance heating conduit comprising tube means for carrying a heating medium, said tube means being disposed with a long-distance conduit, and said tube means including:

(a) at least one tubular member through which said heating medium is carried, (b) at least one layer of heat-insulating material completely peripherally surrounding each individual tubular member, said at least one layer consisting of preformed hollow cylindrical sections disposed with an outer cylindrical surface, (c) cover foil means contiguous to said outer cylindrical surface of said preformed hollow cylindrical sections of heat-insulating material for covering each individual tubular member and corresponding layer of heat-insulating material, and (d) support means for supporting said completely surrounded and covered tubular member which tubular member is completely surrounded by said layer of heat-insulating material and covered by said cover foil means, wherein said cover foil means is a water impermeable foil layer having at least a portion covering an upper region of said outer cylindrical surface, said portion of said foil layer being provided with a plurality of holes, each of said holes having a diameter which prevents penetration of water therethrough but is permeable to vapor within said cover foil means, wherein said foil layer includes a second portion covering a lower region of said outer cylindrical surface, said second portion of said foil layer being provided with a plurality of second holes, each of second holes having a diameter sufficiently large to allow water within said cover foil means to flow therethrough, wherein said cover foil means completely peripherally surrounds said outer cylindrical surface of said heat-insulating layer for covering said tubular member and corresponding layer of heat-insulating material, and wherein the interior space of said cover foil means has self-drying properties.

18. A long-distance heating conduit according to claim 17, wherein said diameter of said holes of said portion covering said upper region of said outer cylindrical surface is from about 0.05 mm to about 0.2 mm, and wherein said diameter of each of said second holes ranges up to about 6 mm.

19. A long distance heating conduit according to claim 17, wherein said water impermeable foil layer includes a base layer of uniform thickness and a plurality of intersecting reinforcing ribs disposed on at least one surface of said base layer.

20. A long-distance heating conduit according to claim 17, wherein said foil layer includes a strip of water impermeable material completely enclosing said outer cylindrical surface by means of a joint joining respective ends of said strip, said joint including at least one of an adherent bond, a weld or a fold, 21. A long-distance heating conduit according to claim 17, wherein each of said preformed hollow cylindrical sections enclose each individual tubular member over a peripheral angle of about 180°, and wherein said layer of heat-insulating material consists of two said cylindrical sections.

22. A long-distance heating conduit according to claim 17, wherein each of said preformed hollow cylindrical sections enclose each individual tubular member over a peripheral angle of about 120°, and wherein said layer of heat-insulating material consists of three said cylindrical sections.

23. A long-distance heating conduit according to claim 17, wherein each of said preformed hollow cylindrical sections enclose each individual tubular member over a peripheral angle of about 90°, and wherein said layer of heat-insulating material consists of four said cylindrical sections.

24. A long-distance heating conduit comprising tube means for carrying a heating medium, said tube means being disposed with a long-distance conduit, and said tube means including:

(a) at least one tubular member through which said heating medium is carried, (b) at least one layer of heat-insulating material completely peripherally surrounding each individual tubular member, said at least one layer consisting of preformed hollow cylindrical sections disposed with an outer cylindrical surface, (c) cover foil means contiguous to said outer cylindrical surface of said preformed hollow cylindrical sections of heat-insulating material for covering each individual tubular member and corresponding layer of heat-insulating material, (d) support means for supporting said completely surrounded and covered tubular member which tubular member is completely surrounded by said layer of heat-insulating material and covered by said cover foil means, and (e) said at least one tubular member being prefabricated in sections with said heat-insulating material layer and cover foil means completely surrounding the periphery of said prefabricated sections, wherein said prefabricated sections are subsequently joined into a long-distance heating conduit, and said layers of heat-insulating material and cover foil means are applied to the joined portions of said conduit, wherein said cover foil means is a water impermeable foil layer having at least a portion covering an upper region of said outer cylindrical surface, said portion of said foil layer being provided with a plurality of holes, each of said holes having a diameter which prevents penetration of water therethrough but is permeable to vapor within said cover foil means, wherein said foil layer includes a second portion covering a lower region of said outer cylindrical surface, said second portion of said foil layer being provided with a plurality of second holes, each of second holes having a diameter sufficiently large to allow water within said cover foil means to flow therethrough, wherein said cover foil means completely peripherally surrounds said outer cylindrical surface of said heat-insulating layer for covering said tubular member and corresponding layer of heat-insulating material, and wherein the interior space of said cover foil means has self-drying properties.

25. A long-distance heating conduit according to claim 24, wherein said diameter of said holes of said portion covering said upper region of said outer cylindrical surface is from about 0.05mm to about 0.2 mm, and wherein said diameter of each of said second holes ranges up to about 6mm.

26. A long-distance heating conduit according to claim 24, wherein said water impermeable foil layer includes a base layer of uniform thickness and a plurality of intersecting reinforcing ribs disposed on at least one surface of said base layer.

27. A long-distance heating conduit according to claim 24, wherein said foil layer includes a strip of water impermeable material completely enclosing said outer cylindrical surface by means of a joint joining respective ends of said strip, said joint including at least one of an adherent bond, a weld or a fold.

28. A long-distance heating conduit according to claim 24, wherein each of said preformed hollow cylindrical sections enclose each individual tubular member over a peripheral angle of about 180°, and wherein said layer of heat-insulating material consists of two said cylindrical sections.

29. A long-distance heating conduit according to claim 24, wherein each of said preformed hollow cylindrical sections enclose each individual tubular member over a peripheral angle of about 120°, and wherein said layer of heat-insulating material consists of three said cylindrical sections.

30. A long-distance heating conduit according to claim 24, wherein each of said preformed hollow cylindrical sections enclose each individual tubular member over a peripheral angle of about 90°, and wherein said layer of heat-insulating material consists of four said cylindrical sections.

* * * * *